(12) United States Patent
Herman (10) Patent No.: US 12,026,996 B2
(45) Date of Patent: Jul. 2, 2024

(54) VEHICLE DATA STORAGE ACTIVATION (71) Applicant: Ford Global Technologies, LLC, Dearborn, MI (US)

(72) Inventor: David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 17/712,387

(22) Filed: Apr. 4, 2022

(65) Prior Publication Data

US 2023/0316830 A1    Oct. 5, 2023

(51) Int. Cl.
*B60W 50/10* (2012.01)
*B60W 30/08* (2012.01)
*B60W 40/09* (2012.01)
*G07C 5/00* (2006.01)
*G07C 5/08* (2006.01)

(52) U.S. Cl.
CPC .............. *G07C 5/085* (2013.01); *B60W 30/08* (2013.01); *B60W 40/09* (2013.01); *B60W 50/10* (2013.01); *G07C 5/008* (2013.01); *B60W 2540/215* (2020.02); *B60W 2540/30* (2013.01)

(58) Field of Classification Search
None
See application file for complete search history.

(56) References Cited

U.S. PATENT DOCUMENTS 10,928,277 B1 * 2/2021 Siddique ................. G06N 20/00
11,225,259 B1 * 1/2022 Katsuki ................. B60K 28/066
11,586,854 B2 * 2/2023 Ahuja ................... G05D 1/0214
2017/0021764 A1 * 1/2017 Adams ................... G06Q 40/08
2018/0025430 A1 * 1/2018 Perl ...................... G01C 21/3697
                                                                    705/4
2018/0240290 A1 * 8/2018 Kumar ................. G07C 5/0808
2019/0258251 A1   8/2019 Ditty et al.
2020/0062249 A1 * 2/2020 Light ..................... G08G 1/017
2020/0334732 A1 * 10/2020 Tseng ..................... G06Q 50/40
2021/0082291 A1 * 3/2021 Villa ..................... B64C 39/024
2021/0118245 A1   4/2021 Gyllenhammar et al.
(Continued)

OTHER PUBLICATIONS

Slivkins. A., "Introduction to Multi-Armed Bandits," arXiv:1904.07272v6 [cs.LG], Jun. 26, 2021, 183 pages.
(Continued)

*Primary Examiner* — Justin S Lee
(74) *Attorney, Agent, or Firm* — Christopher Storms; Bejin Bieneman PLC (57) ABSTRACT

A computer includes a processor and a memory, and the memory stores instructions executable by the processor to receive data recorded in a plurality of vehicles, the data including a plurality of decisions about activating a feature of the vehicles and values of a plurality of variables; receive a plurality of decision scores indicating whether the respective decision was optimal according to the data recorded in the respective vehicle; determine an uncertainty function indicating an uncertainty of a likely value of the decision score based on the values of the variables; determine a set of conditions for the variables based on the uncertainty function; and transmit an instruction to the vehicles to record and upload data when the values of the variables satisfy the set of the conditions.

20 Claims, 5 Drawing Sheets

(56) References Cited

U.S. PATENT DOCUMENTS

| | | |
|---|---|---|
| 2021/0178585 A1 | 6/2021 | Rozo et al. |
| 2022/0126864 A1* | 4/2022 | Moustafa ............ B60W 30/182 |
| 2022/0309521 A1* | 9/2022 | Stenneth ................ G06N 5/022 |
| 2023/0222267 A1* | 7/2023 | Muehlenstaedt ...... G06V 20/56 |
| | | 703/8 |
| 2023/0373498 A1* | 11/2023 | Schröder ................. G06N 3/02 |

OTHER PUBLICATIONS

Mahajan, A., et al., "Multi-Armed Bandit Problems," Foundations and Applications of Sensor Management, University of Michigan, Ann Arbor, MI, Oct. 2007, 70 pages.

Bouneffouf, D et al., "A Survey on Practical Applications of Multi-Armed and Contextual Bandits, " arXiv:1904.10040v1 [cs. LG], Apr. 2, 2019, 8 pages.

de Freitas, N., "Bayesian optimization, bandits and Thompson sampling," CPSC540, Feb. 2013, 31 pages.

* cited by examiner

VEHICLE DATA STORAGE ACTIVATION

BACKGROUND

Modern vehicles often include a plurality of sensors that generate data. The sensors can provide data about the operation of the vehicle, for example, wheel speed, wheel orientation, steering angle, steering-wheel angle, steering-column torque, gear shifting, accelerator-pedal position, brake-pedal position, brake-pad application force, and engine and transmission data (e.g., temperature, fuel consumption, etc.). For example, the sensors can include torque sensors, position sensors, temperature sensors, etc. The sensors can detect the location and/or orientation of the vehicle. For example, the sensors can include global positioning system (GPS) sensors; accelerometers such as piezoelectric or microelectromechanical systems (MEMS); gyroscopes such as rate, ring laser, or fiber-optic gyroscopes; inertial measurements units (IMU); and magnetometers. The sensors can detect the external world, e.g., objects and/or characteristics of surroundings of the vehicle, such as other vehicles, road lane markings, traffic lights and/or signs, pedestrians, etc. For example, the sensors can include radar sensors, scanning laser range finders, light detection and ranging (LIDAR) devices, and image processing sensors such as cameras.

DETAILED DESCRIPTION

Systems and methods described herein provide an efficient way to collect, communicate, and store vehicle data in certain situations in which a feature of the vehicle may or may not have activated. The feature can be, e.g., a driver-assistance system such as forward collision warning, lane-departure warning, blind-spot warning, automatic emergency braking, adaptive cruise control, or lane-keeping assistance. Vehicle data can be useful for assessing performance of the feature. Vehicles can generate large quantities of data, and collecting, including communicating and storing, all of that data may be impractical and/or technically infeasible. Vehicle data gathered during certain situations may be helpful for assessing performance because that data is more likely to provide new information about the performance of the vehicle.

To collect and store the vehicle data about the feature, the system described herein can include a computer programmed to transmit, via a computer network, an instruction to a plurality of vehicles to record and upload data when values of a plurality of variables satisfy a set of conditions. The variables can be any type of data stored or transmitted on board a vehicle. To determine the conditions, the computer first receives data recorded in the vehicles from the vehicles. The data can include a plurality of decisions about activating the feature and values of the variables during periods of time encompassing the decisions. The decisions can include both decisions to activate the feature and decisions to refrain from activating the feature. Next, the computer receives a plurality of what will be referred to as "decision scores." Each decision score can indicate whether a respective decision about activating the feature during the respective period of time was optimal according to the data recorded in that vehicle during that period of time. The decision scores can be user-inputted or automatically generated, e.g., by a neural network. Next, the computer determines an uncertainty function returning an expected uncertainty score as a function of the variables. When the variables equal some set of the values, the expected uncertainty score indicates an uncertainty of a likely value of the decision score at that set of the values. In other words, the uncertainty function gives a confidence in the decision score based on the values of the variables. Next, the computer determines the set of the conditions based on the uncertainty function, and lastly transmits the instruction with the set of the conditions.

A computer includes a processor and a memory, and the memory stores instructions executable by the processor to receive data recorded in a plurality of vehicles, the data including a plurality of decisions about activating a feature of the vehicles and values of a plurality of variables during periods of time encompassing the decisions; receive a plurality of decision scores, wherein each decision score indicates whether the respective decision about activating the feature of the respective vehicle during the respective period of time was optimal according to the data recorded in the respective vehicle during the respective period of time; determine an uncertainty function returning an expected uncertainty score as a function of the variables, wherein, for the variables equaling a set of the values, the expected uncertainty score indicates an uncertainty of a likely value of the decision score at that set of the values; determine a set of conditions for the variables based on the uncertainty function; and transmit an instruction to the vehicles to record and upload data when the values of the variables satisfy the set of the conditions.

The decisions about activating the feature may include decisions to refrain from activating the feature. The decisions about activating the feature may include decisions to activate the feature.

The set of conditions for the variables may include a set of ranges of the variables.

The feature may be one of forward collision warning, lane-departure warning, blind-spot warning, automatic emergency braking, adaptive cruise control, or lane-keeping assistance.

Determining the set of the conditions may provide a higher likelihood of selecting a particular set of the conditions when the uncertainty function for the particular set indicates a higher uncertainty.

The decision scores may be true decision scores; the instructions may further include instructions to determine a score function returning an expected decision score as a function of the variables; and for the variables equaling a set of the values, the expected decision score may indicate a likely value of the true decision score at that set of the values. Determining the set of the conditions may be based on the score function. Determining the set of the conditions may include performing Bayesian optimization using an acquisition function, and the acquisition function may incorporate the score function and the uncertainty function. The set of the conditions may be satisfied by values giving a maximum value of the acquisition function.

The acquisition function may include an upper confidence bound.

Determining the score function may include modeling the decision scores as a Gaussian process.

Determining the set of the conditions may provide a higher likelihood of selecting a particular set of the conditions when the score function for the particular set indicates a higher likelihood of a suboptimal decision.

The instructions may further include instructions to receive a program for controlling activation of the feature, and to simulate the activation of the feature by the program using the data received from the vehicles. The program may be a second program, a first program may be installed on the vehicles during the periods of time, and the second program may be a different version than the first program.

The decisions may be first decisions, the decision scores may be first decision scores, the instructions may further include instructions to receive a plurality of second decision scores, and the second decision scores may indicate whether second decisions to activate the feature during the simulation were optimal. Determining the uncertainty function may be based on the second decision scores.

The data may include unstructured data.

The decision scores may be discrete classifications.

A method includes receiving data recorded in a plurality of vehicles, the data including a plurality of decisions about activating a feature of the vehicles and values of a plurality of variables during periods of time encompassing the decisions; receiving a plurality of decision scores, wherein each decision score indicates whether the respective decision about activating the feature of the respective vehicle during the respective period of time was optimal according to the data recorded in the respective vehicle during the respective period of time; determining an uncertainty function returning an expected uncertainty score as a function of the variables, wherein, for the variables equaling a set of the values, the expected uncertainty score indicates an uncertainty of a likely value of the decision score at that set of the values; determining a set of conditions for the variables based on the uncertainty function; and transmitting an instruction to the vehicles to record and upload data when the values of the variables satisfy the set of the conditions.

With reference to the Figures, wherein like numerals indicate like parts throughout the several views, a computer 100 includes a processor and a memory, and the memory stores instructions executable by the processor to receive data recorded in a plurality of vehicles 102, the data including a plurality of decisions about activating a feature of the vehicles 102 and values of a plurality of variables during periods of time encompassing the decisions; receive a plurality of true decision scores 104 (see FIGS. 4-5B), wherein each true decision score 104 indicates whether the respective decision about activating the feature of the respective vehicle 102 during the respective period of time was optimal according to the data recorded in the respective vehicle 102 during the respective period of time; determine an uncertainty function 106 returning an expected uncertainty score as a function of the variables, wherein, for the variables equaling a set of the values, the expected uncertainty score indicates an uncertainty of a likely value of the true decision score 104 at that set of the values; determine a set of conditions for the variables based on the uncertainty function 106; and transmit an instruction 108 to the vehicles 102 to record and upload data when the values of the variables satisfy the set of the conditions.

Figure 1:
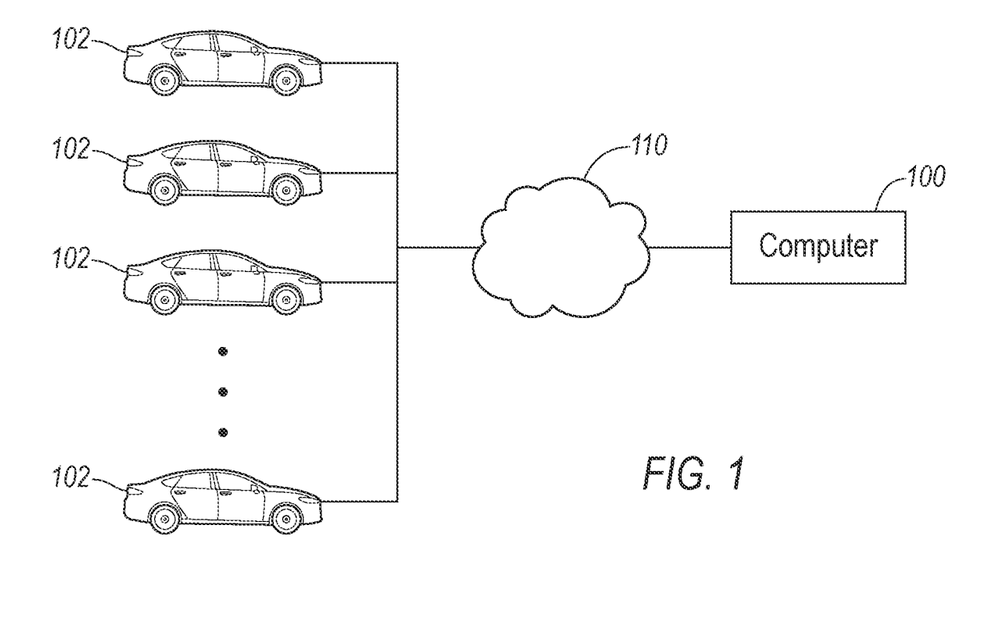
FIG. 1 is a block diagram of a plurality of vehicles in communication with a computer.

With reference to FIG. 1, the vehicles 102 may each be any passenger or commercial automobile such as a car, a truck, a sport utility vehicle, a crossover, a van, a minivan, a taxi, a bus, a jeepney, etc.

The vehicles 102 can communicate with the computer 100 over a network 110. The network 110 represents one or more mechanisms by which the computer 100 may communicate with remote entities. Accordingly, the network 110 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The computer 100 is a microprocessor-based computing device, e.g., a generic computing device including a processor and a memory. The memory of the computer 100 can include media for storing instructions executable by the processor as well as for electronically storing data and/or databases. The computer 100 can be multiple computers coupled together. Alternatively or additionally, the computer 100 can include vehicle computers 112 that are on board the respective vehicles 102, in addition to a central computer remote from the vehicles 102. For example, in the computation of the Gaussian process described below, the computer 100 can use a distributed or federated approach in which a majority of the computing occurs within the vehicle computers 112 and a central computer is periodically updated to allow coordination of the vehicle computers 112 in the computation.

Figure 2:
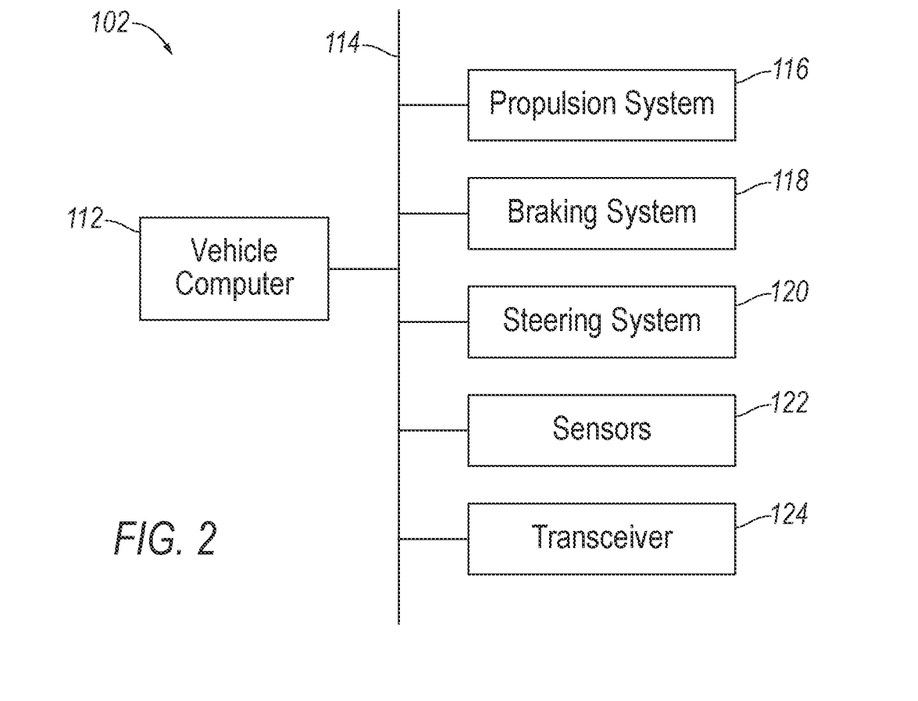
FIG. 2 is a block diagram of one of the vehicles.

With reference to FIG. 2, each vehicle 102 can include the vehicle computer 112. The vehicle computer 112 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 112 can thus include a processor, a memory, etc. The memory of the vehicle computer 112 can include media for storing instructions executable by the processor as well as for electronically storing data and/or databases, and/or the vehicle computer 112 can include structures such as the foregoing by which programming is provided. The vehicle computer 112 can be multiple computers coupled together on board the vehicle 102.

The vehicle computer 112 may transmit and receive data on board the vehicle 102 through a communications network 114 such as a controller area network (CAN) bus, Ethernet, WiFi, Local Interconnect Network (LIN), onboard diagnostics connector (OBD-II), and/or by any other wired or wireless communications network. The vehicle computer 112 may be communicatively coupled to a propulsion system 116, a braking system 118, a steering system 120, sensors 122, a transceiver 124, and other components via the communications network 114.

The propulsion system 116 of the vehicle 102 generates energy and translates the energy into motion of the vehicle 102. The propulsion system 116 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 116 can include an electronic control unit (ECU) or the like that is in communication with and receives input from the vehicle computer 112 and/or a human operator. The human operator may control the propulsion system 116 via, e.g., an accelerator pedal and/or a gear-shift lever.

The braking system 118 is typically a conventional vehicle braking subsystem and resists the motion of the vehicle 102 to thereby slow and/or stop the vehicle 102. The braking system 118 may include friction brakes such as disc brakes, drum brakes, band brakes, etc.; regenerative brakes; any other suitable type of brakes; or a combination. The braking system 118 can include an electronic control unit (ECU) or the like that is in communication with and receives input from the vehicle computer 112 and/or a human operator. The human operator may control the braking system 118 via, e.g., a brake pedal.

The steering system 120 is typically a conventional vehicle steering subsystem and controls the turning of the wheels. The steering system 120 may be a rack-and-pinion system with electric power-assisted steering, a steer-by-wire system, as both are known, or any other suitable system. The steering system 120 can include an electronic control unit (ECU) or the like that is in communication with and receives input from the vehicle computer 112 and/or a human operator. The human operator may control the steering system 120 via, e.g., a steering wheel.

The sensors 122 may provide data about operation of the vehicle 102, for example, wheel speed, wheel orientation, and engine and transmission data (e.g., temperature, fuel consumption, etc.). The sensors 122 may detect the location and/or orientation of the vehicle 102. For example, the sensors 122 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 122 may detect the external world, e.g., objects and/or characteristics of surroundings of the vehicle 102, such as other vehicles, road lane markings, traffic lights and/or signs, pedestrians, etc. For example, the sensors 122 may include radar sensors, ultrasonic sensors, scanning laser range finders, light detection and ranging (LIDAR) devices, and image processing sensors such as cameras. Sensor predictions and outputs may be stored on the vehicle computer 112 as unstructured data, structured data, or some form in between.

The vehicle computer 112 can be programmed to store data received over the communications network 114, e.g., from the propulsion system 116, the braking system 118, the steering system 120, and the sensors 122, in a rolling buffer. The rolling buffer can be a portion of the memory of the vehicle computer 112. The rolling buffer can store the data for a set period of time, e.g., five seconds; in other words, at any given time, the rolling buffer contains the data generated on board the vehicle 102 in the last five seconds. As new data is generated and stored in the rolling buffer, the oldest data in the rolling buffer is overwritten (a rolling buffer is sometimes also referred to as a ring buffer or a circular buffer). The vehicle computer 112 can be programmed to, in response to a trigger, store the data contained in the rolling buffer in memory indefinitely, i.e., so that the copy stored in the memory is not overwritten. The data may be processed in an unstructured form, a structured form, some form in between, or a compressed form, e.g., in a form compressed to a lower-dimensional space, e.g., via manifold learning. The data may be stored in multiple forms, e.g., in an unstructured or structured form for upload to the computer 100 as described below and in a compressed form for use in computing a Gaussian process as described below, e.g., when the computation of the Gaussian process is distributed or federated to the vehicle computers 112.

The transceiver 124 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 124 may be adapted to communicate with a remote server, that is, a server distinct and spaced from the vehicle 102, via the network 110. The remote server may be located outside the vehicle 102. For example, the remote server may be the computer 100. For another example, the remote server may be associated with another vehicle (e.g., V2V communications), an infrastructure component (e.g., V2I communications), an emergency responder, a mobile device associated with the owner of the vehicle 102, etc. The transceiver 124 may be one device or may include a separate transmitter and receiver.

The vehicle 102 can include one or more features. The features can be advanced driver assistance systems (ADAS). For example, the feature can be one of forward collision warning, lane-departure warning, or blind-spot warning. The features can be semi-autonomous features, and activating the feature can include actuating at least one of the propulsion system 116, the braking system 118, or the steering system 120. For example, the feature can be one of automatic emergency braking, adaptive cruise control, or lane-keeping assistance. The features can be any other system or device on board the vehicle 102 that activates without intervention by an operator, e.g., antilock braking, temperature-activated climate control, Bluetooth® detection of a mobile device, etc.

The vehicle computer 112 can store a program, i.e., a set of program instructions executable by a processor of the vehicle computer 112, for deciding whether to activate the feature. The vehicle computer 112 can use the program to make the decisions about whether to activate the feature. For example, the program can set out criteria for activating the feature, e.g., criteria based on data from the sensors 122 and/or from the vehicle systems 116, 118, 120. The vehicle computer 112 can activate the feature in response to the data satisfying the criteria. For example, if the feature is a lane-departure warning or lane-keeping assistance, the criteria can be that camera data indicates that the vehicle 102 is less than a threshold distance from a lane boundary. The criteria can use a subset of the variables, meaning that at least one variable, e.g., several of the variables, are not used to decide whether to activate the feature. The decisions about activating the feature can include decisions to activate the feature and decisions to refrain from activating the feature. As described below, the computer 100 can transmit updated programs to the vehicles 102 to replace the programs stored in the vehicle computers 112, e.g., with different criteria for activating the feature.

The vehicle computer 112 can store data to the rolling buffer. The data stored to the rolling buffer can include any data transmitted over the communications network 114, e.g., from the propulsion system 116, the braking system 118, the steering system 120, and the sensors 122. The data can include the decisions about activating the feature. For example, the decisions can be represented as a binary variable, e.g., taking values of 1 for activated and 0 for unactivated, over a time series. The data can include values of a plurality of variables. For the purposes of this disclosure, a "variable" is, as understood in computer arts, a datum or set of data that is able to take on multiple values; a variable can be transmitted over the communications network 114. Variables can be raw data, e.g., distance ranges from ultrasonic sensors, or RPMs of an engine of the propulsion system 116, or the variables can be calculated from other data, e.g., a predicted time to impact with another vehicle in front of the vehicle 102. The data can include structured data and unstructured data. Structured data is data that is organized in a standardized format. For example, data that is sent through a CAN bus that may be included in the communications network 114 is typically in the Database Container (.dbc) file format, which is a type of structured data. Some sensors 122, such as cameras, can produce unstructured data.

The vehicle computer 112 can be programmed to upload the data stored in the rolling buffer in response to a set of conditions being satisfied. For example, the conditions can include a set of ranges, and the conditions can be satisfied by the values of the variables being within the set of ranges. A range is an upper bound and a lower bound for a variable. For example, the set of ranges can include one range for each of several variables, and if each of those variables falls within the corresponding range, then the conditions are satisfied. For another example, the conditions can include a set of alternative logical statements about the variables, and the conditions can be satisfied when the values of the variables make at least one of the logical statements true. For another example, the conditions can include distributed or federated portions of a Bayesian optimization, as described below with respect to FIGS. 5A-B.

Figure 3:
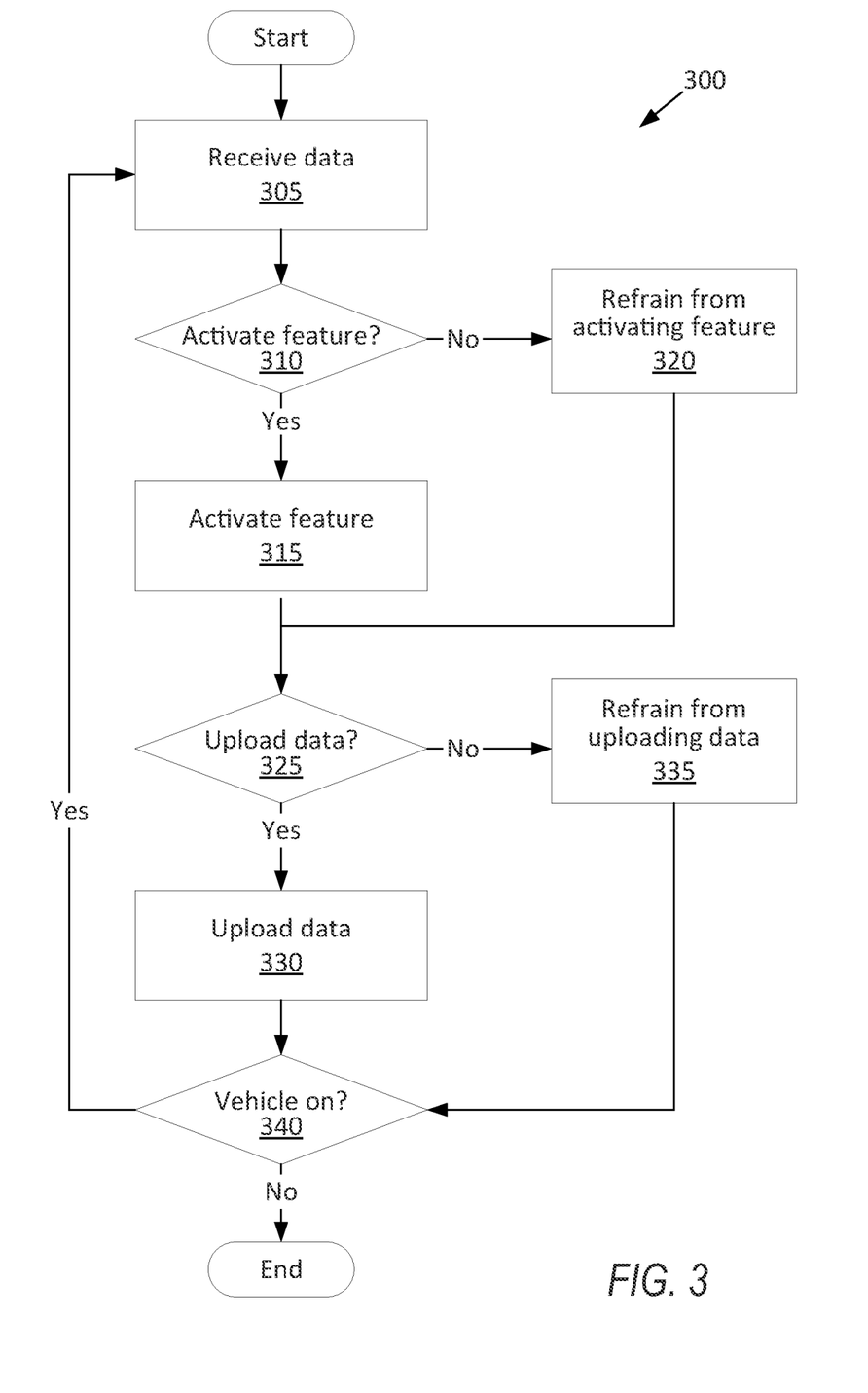
FIG. 3 is a process flow diagram of an example process for uploading data to the computer from one of the vehicles.

FIG. 3 is a process flow diagram illustrating an exemplary process 300 for uploading data from one of the vehicles 102 to the computer 100. The memory of the vehicle computer 112 stores executable instructions for performing the steps of the process 300 and/or programming can be implemented in structures such as mentioned above. As a general overview of the process 300, the vehicle computer 112 receives data through the communications network 114. If the criteria for activating the feature are satisfied, the vehicle computer 112 activates the feature; otherwise, the vehicle computer 112 refrains from activating the feature. If the conditions for uploading data are satisfied, the vehicle computer 112 instructs the transceiver 124 to transmit the data to the computer 100; otherwise, the vehicle computer 112 refrains from uploading the data. The process 300 typically continues for as long as the vehicle 102 remains on.

The process 300 begins in a block 305, in which the vehicle computer 112 receives the data and the data is stored in the rolling buffer, as described above.

Next, in a decision block 310, the vehicle computer 112 determines whether to activate the feature according to the program stored on the vehicle computer 112, as described above. If the vehicle computer 112 determines to activate the feature, the process 300 proceeds to a block 315. If not, the process 300 proceeds to a block 320.

In the block 315, the vehicle computer 112 activates the feature, as described above. The vehicle computer 112 can store that the feature has been activated to the data. After the block 315, the process 300 proceeds to a decision block 325.

In the block 320, the vehicle computer 112 refrains from activating the feature, as described above. The vehicle computer 112 can store that the feature is inactive to the data. After the block 320, the process 300 proceeds to the decision block 325.

In the decision block 325, the vehicle computer 112 determines whether to upload the data, as described above. If the vehicle computer 112 determines to upload the data, the process 300 proceeds to a block 330. If the vehicle computer 112 determines not to upload the data, the process 300 proceeds to a block 335.

In the block 330, the vehicle computer 112 instructs the transceiver 124 to transmit the data through the network 110 to the computer 100, e.g., the data currently stored in the rolling buffer. Alternatively, the vehicle computer 112 can store the data to permanent storage in the memory of the vehicle computer 112, and then the vehicle computer 112 can instruct the transceiver 124 to transmit the permanently stored data through the network 110 to the computer 100, which may occur at a later time if the network 110 is unavailable. The data can be in a raw, i.e., unprocessed, form when uploaded. The vehicle computer 112 then deletes the data from the rolling buffer as more data is recorded. After the block 330, the process 300 proceeds to a decision block 340.

In the block 335, the vehicle computer 112 refrains from uploading the data to the computer 100. The vehicle computer 112 then deletes the data from the rolling buffer as more data is recorded. After the block 335, the process 300 proceeds to the decision block 340.

In the decision block 340, the vehicle computer 112 determines whether the vehicle 102 is still on. If so, the process 300 returns to the block 305 to continue receiving data. If the vehicle 102 has been turned off, the process 300 ends.

Figure 4:
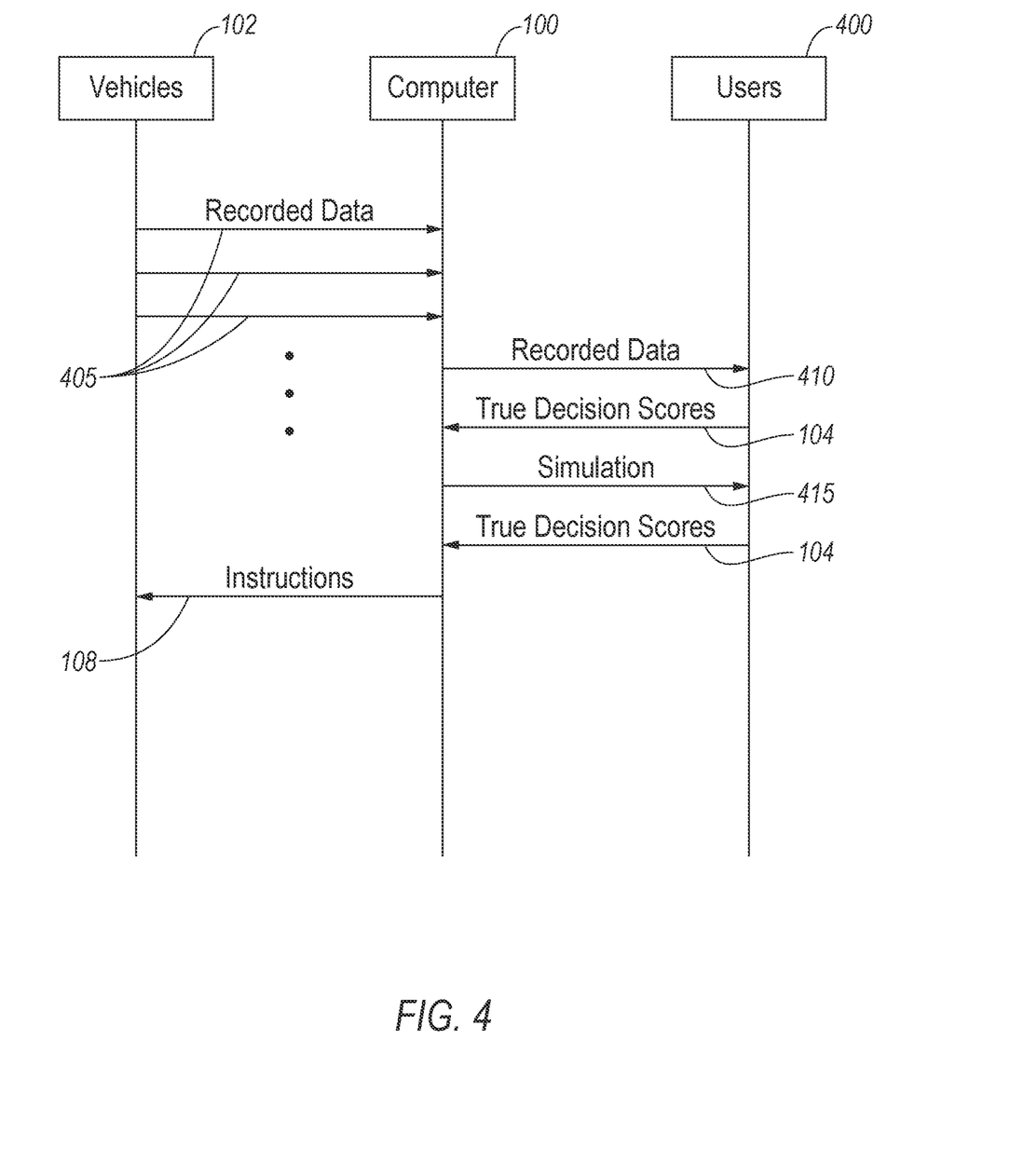
FIG. 4 is a sequence diagram illustrating determining data for the vehicles to collect.
Figure 5A:
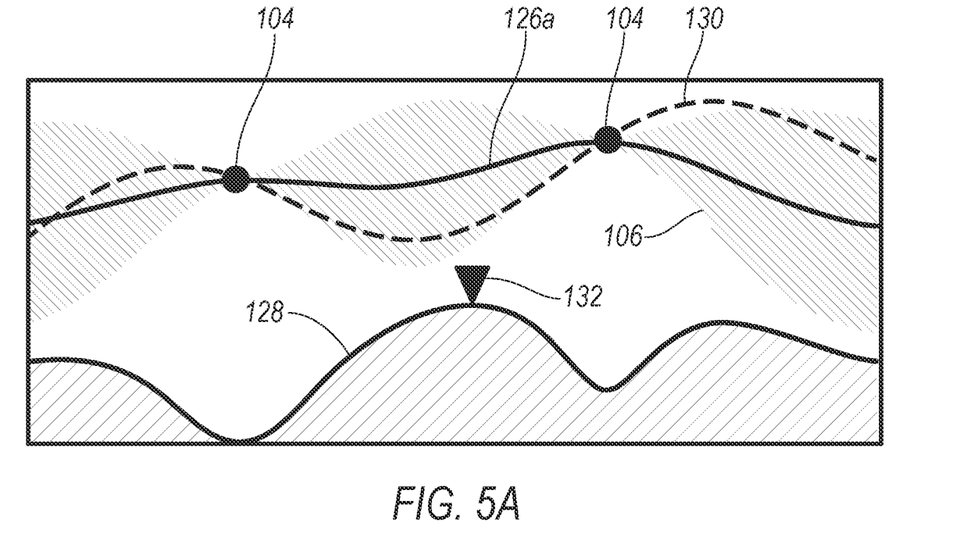
FIG. 5A is a plot of an example score function of optimality of activating a feature by the vehicles and an example acquisition function.

With reference to FIG. 4, a sequence diagram illustrating determining data for the vehicles 102 to collect, the computer 100 can be programmed to receive a plurality of data transmissions 405 of data recorded in a plurality of the vehicles 102, e.g., transmitted by the vehicles 102 as described above with respect to the block 330 of the process 300.

The computer 100 can be programmed to provide outputs 410 of the data received from the vehicles 102 to one or more users 400. The users 400 can evaluate the data to determine true decision scores 104 for the data. Specifically, the users 400 can generate one true decision score 104 for each data transmission 405 from one of the vehicles 102 applying to the decision to activate or not activate the feature during the period of time corresponding to that data transmission 405. The true decision score 104 indicates whether the decision about activating the feature was optimal, i.e., matches what the user 400 determines about whether the feature should have been activated. Matching means either activating when the feature should activate or not activating when the feature should not activate. The true decision scores 104 are discrete classifications. For example, the true decision scores 104 can take values of "optimal" or "suboptimal." For another example, the true decision scores 104 can take values that are subcategories of "optimal" and/or "suboptimal," e.g., "optimal—high importance," "optimal—low importance," "suboptimal—high importance," "suboptimal—low importance," etc. The discrete classifications can be mapped to discrete numerical values, e.g., "optimal" to 0 and "suboptimal" to 1; or "optimal—high importance" to 1, "optimal—low importance" to 2, "suboptimal—low importance" to 3, and "suboptimal—high importance" to 4.

The computer 100 can be programmed to determine true decision scores 104 for the decisions based on the data from the respective vehicle 102, without direct input from the users 400. For example, the computer 100 can execute a machine-learning program, e.g., a convolutional neural network, to determine the true decision scores 104. The convolutional neural network can be trained on a plurality of data transmissions 405 from the vehicles 102 for which users 400 have given true decision scores 104 as described immediately above, with the user-inputted true decision scores 104 serving as ground truth.

The computer 100 can be programmed to receive the true decision scores 104 from the users 400 and/or from the determination by the computer 100.

The computer 100 can be programmed to receive a program for controlling activation of the feature. The program is capable of being installed on the vehicle computers 112 to control activation of the feature, as described above. The program can be a different version than the program installed on the vehicle computers 112 when the data transmissions 405 were sent. For example, the program can be updated, i.e., can have design changes, compared to the program installed on the vehicle computers 112. The design changes may be changes to the criteria for activating the features. The updated program may therefore activate the feature under different circumstances than the currently installed program.

The computer 100 can be programmed to simulate the activation of the feature by the updated program using the data received in the data transmissions 405 from the vehicles 102. In other words, the simulation determines whether the updated program would have activated the feature in the situations encountered by the vehicles 102 that led to the data transmissions 405 of the data from the vehicles 102. The simulation can be any suitable type of simulation, e.g., model-in-the-loop (MIL), software-in-the-loop (SIL), processor-in-the-loop (PIL), hardware-in-the-loop (HIL), etc. The simulation generates a new set of decisions for the data previously received from the vehicles 102.

The computer 100 can be programmed to provide outputs 415 of the data with the new decisions and receive new true decision scores 104 rating those new decisions, in the same manner as described above. The new true decision scores 104 indicate whether the new decisions to activate the feature during the simulation were optimal, as described above. The description below can use either the new true decision scores 104, or if the simulation is not performed, the description below can use the previously described true decision scores 104.

The computer 100 can be programmed to reduce the dimensionality of the variables in the data received from the vehicles 102, i.e., to describe the data with a smaller number of variables. For example, the computer 100 can be programmed to perform principal component analysis (PCA) on the variables. Reducing the dimensionality of the variables can make the analysis described below more feasible for the computer 100 to execute.

Figure 5B:
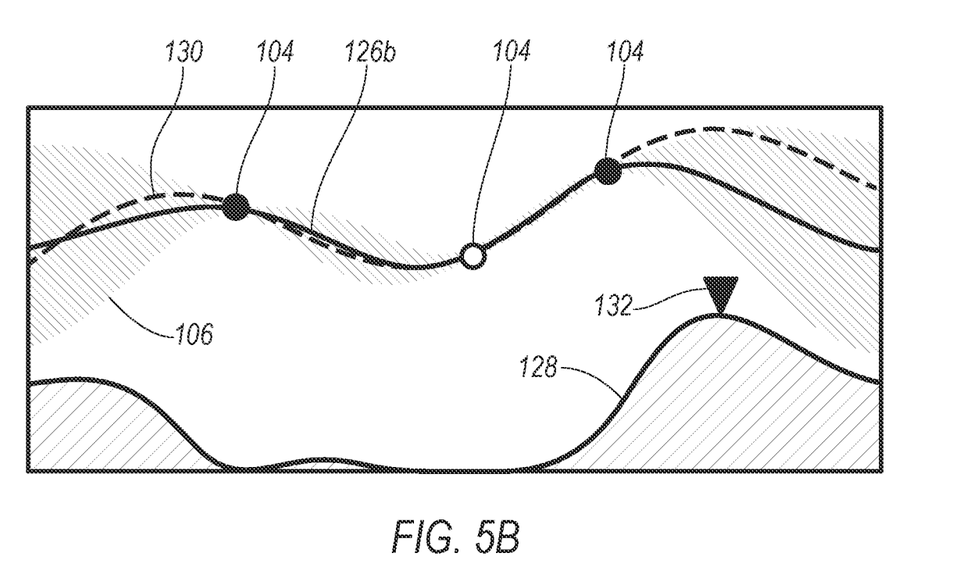
FIG. 5B is a plot of the score function and the acquisition function after updating.

With reference to FIG. 5A, the computer 100 can be programmed to determine a score function 126 returning an expected decision score as a function of the variables. The expected decision score indicates a likely value of the true decision score 104 given the set of values used as the argument to the score function 126. FIGS. 5A and 5B plot the score functions 126a, 126b, in which the vertical axis is numerical values for the classifications of the decision score, and the horizontal axis is one variable of the variables. (As will be described below, 126a is a prior score function and 126b is a posterior score function; 126 is used to refer to both.) The score function 126 passes through the true decision scores 104 that are known. The score function 126 is an approximation of the true decision scores 104 at values of the variables for which the true decision scores 104 are not known. For reference, FIG. 5A also shows a true-score function 130 of the actual true decision scores 104, which is not known by the computer 100. Determining the score function 126 can include modeling the expected decision scores as a Gaussian process. A Gaussian process is a stochastic process of the variables for which each subset of the variables follows a multivariate normal distribution. Determining the score function 126 can be based on the true decision scores 104 returned by the users 400 or determined by the computer 100. For example, the true decision scores 104 can serve as the sample from which to construct the score function 126 as the mean of a Gaussian process.

The computer 100 can be programmed to determine an uncertainty function 106 returning an expected uncertainty score as a function of the variables. For the variables equaling a set of the values, the expected uncertainty score indicates an uncertainty of the score function 126, i.e., an uncertainty of a likely value of the true decision score 104 at that set of the values. FIG. 5A shows output of the uncertainty function 106 represented by the shaded area surrounding the score function 126. As the variables get further away from the known true decisions scores 104, the uncertainty function 106 gets larger, i.e., has a wider band around the score function 126. Determining the uncertainty scores can include modeling the decision scores as a Gaussian process, e.g., as the same model as used for the score function 126. Determining the uncertainty function 106 can be based on the true decision scores 104. For example, the true decision scores 104 can serve as the sample from which to construct the uncertainty function 106 as the variance or standard deviation of a Gaussian process.

The computer 100 can be programmed to determine an acquisition function 128. As will be described below, the computer 100 can use the acquisition function 128 to determine the set of the conditions for the variables at which the vehicle 102 should record and upload more data. The acquisition function 128 can incorporate the score function 126 and the uncertainty function 106. Incorporating the score function 126 into the acquisition function 128 permits finding the conditions most likely to produce suboptimal activation of the feature. Incorporating the uncertainty function 106 into the acquisition function 128 permits finding the conditions giving the most uncertainty about whether the feature will optimally activate. The computer 100 can use any suitable acquisition function 128, e.g., probability of improvement, expected improvement, Bayesian expected losses, upper confidence bound, Thompson sampling, combinations of the foregoing, etc. For example, the acquisition function 128 can be a Gaussian-process upper confidence bound (GP-UCB), e.g., $$A(x) = \mu(x) + \sqrt{v\beta_t}\sigma(x)$$

in which A is the acquisition function 128, x is the variables arranged in a vector, μ is the score function 126, ν and $β_t$ are tunable parameters, and σ is the uncertainty function 106. The tunable parameters ν and $β_t$ can be chosen to balance a tradeoff between searching for suboptimal activations of the feature and uncertainty of activation of the feature, i.e., a tradeoff between the score function 126 and the uncertainty function 106.

The computer 100 can be programmed to determine the set of the conditions based on the uncertainty function 106 and/or on the score function 126, e.g., based on the acquisition function 128. For example, the computer 100 can determine the set of the conditions such that there is a higher likelihood of selecting a particular set of the conditions when the score function 126 for the particular set indicates a higher likelihood of a suboptimal decision and when the uncertainty function 106 for the particular set indicates a higher uncertainty.

For example, determining the set of the conditions can include performing Bayesian optimization using the acquisition function 128. Bayesian optimization includes starting with a prior distribution over some inputs, receiving one or more new data points, generating a posterior distribution from the prior distribution and the new data points, determining an acquisition function 128 from the posterior distribution, and determining where to sample new data points from based on the acquisition function 128. In this case, the data points are the values of the variables paired with the true decision scores 104, the prior distribution is the score function 126 before knowing the true decision scores 104 (prior score function 126a), and the posterior distribution is the score function 126 after knowing the true decision scores 104 (posterior score function 126b). The prior score function 126a can initially be determined from knowledge of expected performance of the feature, e.g., based on the design process for that feature. Bayesian optimization can be iterative, so the prior score function 126a can be the posterior score function 126b from the previous iteration. For example, the score function 126 in FIG. 5A can be the prior score function 126a, and the score function 126 in FIG. 5B can be the posterior score function 126b after receiving the new true decision score 104 shown as a white circle in the middle of the plot. The posterior score function 126b and the acquisition function 128 can be determined as described above.

Finally, the computer 100 can determine the set of the conditions that is satisfied by values giving a maximum value 132 of the acquisition function 128. For example, the set of the conditions can include a set of ranges of the variables, and each range of a variable can be the value of that variable at which the acquisition function 128 is maximized plus and minus some predetermined amount, e.g., one standard deviation of that variable. For another example, the set of the conditions can include a set of alternative logical statements about the variables, and at least one of the logical statements can be true when the variables have values giving the maximum value 132 of the acquisition function 128. The logical statements can be true when the variables have values giving local maxima of the acquisition function 128. For another example, the set of the conditions can include distributed or federated portions of calculating the Bayesian optimization, e.g., a distributed portion of a scalable Gaussian process for modeling the decision scores as a Gaussian process, instructions to calculate and optimize an updated acquisition function 128 locally at the vehicle computer 112, etc. Instructions to optimize the acquisition function 128 by the vehicle computer 112 can include determining values for the variables to maximize the GP-UCB described above.

Returning to FIG. 4, the computer 100 can be programmed to transmit the instruction 108 to the vehicles 102 to record and upload the data when the values of the variables satisfy the set of the conditions. The vehicle computers 112 can use the set of the conditions as described above with respect to the process 300 to transmit new data to the computer 100, and the computer 100 can iteratively use the new data to determine a set of new conditions. The iteration can efficiently gather the data most likely to be helpful for determining the program for activating the feature.

Figure 6:
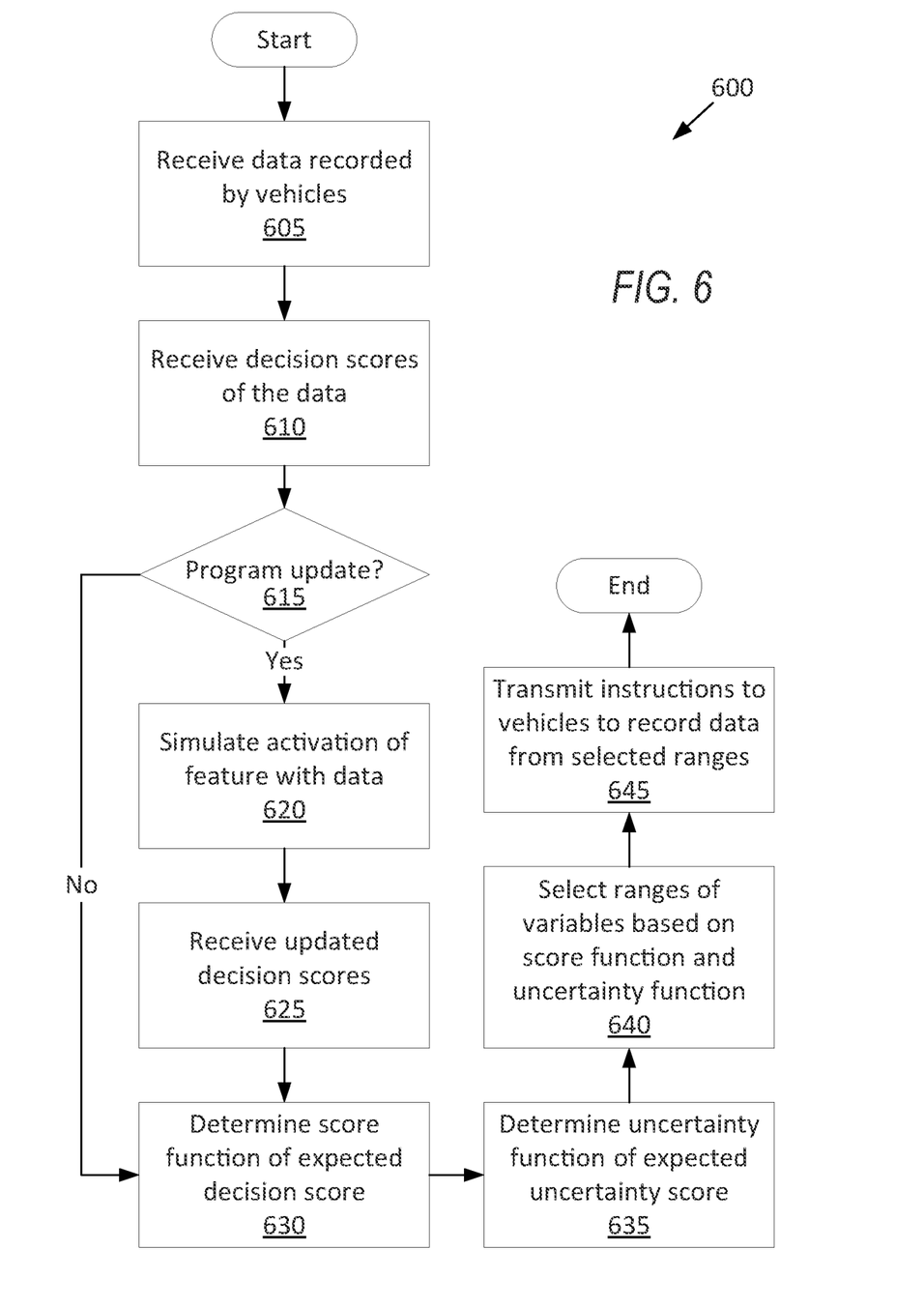
FIG. 6 is a process flow diagram of an example process for determining data for the vehicles to collect.

FIG. 6 is a process flow diagram illustrating an exemplary process 600 for determining the data for the vehicles 102 to collect. The memory of the computer 100 stores executable instructions for performing the steps of the process 600. As a general overview of the process 600, the computer 100 receives the data from the vehicles 102 and receives the true decision scores 104 for that data. If the program for activating the feature has been updated, the computer 100 simulates activation of the feature with the updated program and the data received from the vehicles 102 and receives new true decision scores 104 for the simulation. The computer 100 determines the score function 126, determines the uncertainty function 106, determines the conditions for the variables using the resulting acquisition function 128, and transmits the instruction 108 to the vehicles 102.

The process 600 begins in a block 605, in which the computer 100 receives the data recorded in the vehicles 102, as described above.

Next, in a block 610, the computer 100 receives the true decision scores 104, as described above.

Next, in a decision block 615, the computer 100 determines whether an updated program is available. For example, the computer 100 can determine whether the computer 100 has received an input from a user with an updated program for controlling activation of the feature. If so, the process 600 proceeds to a block 620. If not, the process 600 proceeds to a block 630.

In the block 620, the computer 100 simulates the activation of the feature by the updated program using the data received from the vehicles 102, as described above.

Next, in a block 625, the computer 100 receives the new true decision scores 104, as described above. After the block 625, the process 600 proceeds to the block 630.

In the block 630, the computer 100 determines the score function 126, as described above.

Next, in a block 635, the computer 100 determines the uncertainty function 106, as described above.

Next, in a block 640, the computer 100 determines the set of the conditions based on the score function 126 and the uncertainty function 106, e.g., as combined into the acquisition function 128, as described above.

Next, in a block 645, the computer 100 transmits the instruction 108 to the vehicles 102 to record and upload data when the values of the variables satisfy the set of the conditions, as described above. After the block 645, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
    receive data recorded in a plurality of vehicles, the data including a plurality of decisions about activating a feature of the vehicles and values of a plurality of variables during periods of time encompassing the decisions;
    receive a plurality of decision scores, wherein each decision score indicates whether the respective decision about activating the feature of the respective vehicle during the respective period of time was optimal according to the data recorded in the respective vehicle during the respective period of time;
    determine an uncertainty function returning an expected uncertainty score as a function of the variables, wherein, for the variables equaling a set of the values, the expected uncertainty score indicates an uncertainty of a likely value of the decision score at that set of the values;
    determine a set of conditions for the variables based on the uncertainty function; and
    transmit an instruction to the vehicles to record and upload data when the values of the variables satisfy the set of the conditions.

2. The computer of claim 1, wherein the decisions about activating the feature include decisions to refrain from activating the feature.

3. The computer of claim 2, wherein the decisions about activating the feature include decisions to activate the feature.

4. The computer of claim 1, wherein the set of conditions for the variables includes a set of ranges of the variables.

5. The computer of claim 1, wherein the feature is one of forward collision warning, lane-departure warning, blind-spot warning, automatic emergency braking, adaptive cruise control, or lane-keeping assistance.

6. The computer of claim 1, wherein determining the set of the conditions provides a higher likelihood of selecting a particular set of the conditions when the uncertainty function for the particular set indicates a higher uncertainty.

7. The computer of claim 1, wherein
the decision scores are true decision scores;
the instructions further include instructions to determine a score function returning an expected decision score as a function of the variables; and
for the variables equaling a set of the values, the expected decision score indicates a likely value of the true decision score at that set of the values.

8. The computer of claim 7, wherein determining the set of the conditions is based on the score function.

9. The computer of claim 8, wherein determining the set of the conditions includes performing Bayesian optimization using an acquisition function, and the acquisition function incorporates the score function and the uncertainty function.

10. The computer of claim 9, wherein the set of the conditions is satisfied by values giving a maximum value of the acquisition function.

11. The computer of claim 9, wherein the acquisition function includes an upper confidence bound.

12. The computer of claim 8, wherein determining the score function includes modeling the decision scores as a Gaussian process.

13. The computer of claim 8, wherein determining the set of the conditions provides a higher likelihood of selecting a particular set of the conditions when the score function for the particular set indicates a higher likelihood of a suboptimal decision.

14. The computer of claim 1, wherein the instructions further include instructions to receive a program for controlling activation of the feature, and to simulate the activation of the feature by the program using the data received from the vehicles.

15. The computer of claim 14, wherein the program is a second program, a first program is installed on the vehicles during the periods of time, and the second program is a different version than the first program.

16. The computer of claim 14, wherein the decisions are first decisions, the decision scores are first decision scores, the instructions further include instructions to receive a plurality of second decision scores, and the second decision scores indicate whether second decisions to activate the feature during the simulation were optimal.

17. The computer of claim 16, wherein determining the uncertainty function is based on the second decision scores.

18. The computer of claim 1, wherein the data includes unstructured data.

19. The computer of claim 1, wherein the decision scores are discrete classifications.

20. A method comprising:
receiving data recorded in a plurality of vehicles, the data including a plurality of decisions about activating a feature of the vehicles and values of a plurality of variables during periods of time encompassing the decisions;
receiving a plurality of decision scores, wherein each decision score indicates whether the respective decision about activating the feature of the respective vehicle during the respective period of time was optimal according to the data recorded in the respective vehicle during the respective period of time;
determining an uncertainty function returning an expected uncertainty score as a function of the variables, wherein, for the variables equaling a set of the values, the expected uncertainty score indicates an uncertainty of a likely value of the decision score at that set of the values;
determining a set of conditions for the variables based on the uncertainty function; and
transmitting an instruction to the vehicles to record and upload data when the values of the variables satisfy the set of the conditions.

* * * * *